Patented Aug. 8, 1933

1,921,727

UNITED STATES PATENT OFFICE 1,921,727

METHOD OF SEPARATING ISOMERIC MONO-CHLORO-ORTHO-HYDROXY-DIPHENYLS

Edgar C. Britton and Fred Bryner, Midland, Mich., assignors to The Dow Chemical Company, Midland, Mich., a Corporation of Michigan Application December 21, 1931. Serial No. 582,474

14 Claims. (Cl. 260—154)

The present invention concerns a method of separating a mixture of isomeric monochloro-2-hydroxy-diphenyls, particularly of separating 2-hydroxy-3-chloro-diphenyl and 2-hydroxy-5-chloro-diphenyl from a mixture of said compounds.

When 2-hydroxy-diphenyl is chlorinated according to the method described in our co-pending application, Ser. No. 499,312, filed December 1, 1930, "Chlorophenylphenols and method of making same", a mixture containing isomeric monochloro-2-hydroxy-diphenyls, in the ratio of about 80 per cent, by weight, of 2-hydroxy-3-chloro-diphenyl to about 20 per cent of 2-hydroxy-5-chloro-diphenyl, is obtained. The crude reaction mixture may also contain unreacted 2-hydroxy-diphenyl and polychloro-2-hydroxy-diphenyls, but such impurities are generally present in relatively small quantities. A practical method of separation of the compounds mentioned is much to be desired.

The present invention, then, consists of a method of separating 2-hydroxy-3-chloro-diphenyl and 2-hydroxy-5-chloro-diphenyl from a mixture containing said compounds, such method being hereinafter fully described and particularly pointed out in the claims, the annexed drawings and the following description setting forth in detail several modes of carrying out the invention, such disclosed modes illustrating, however, but several of the various ways in which the principle of the invention may be used.

Figure 1:
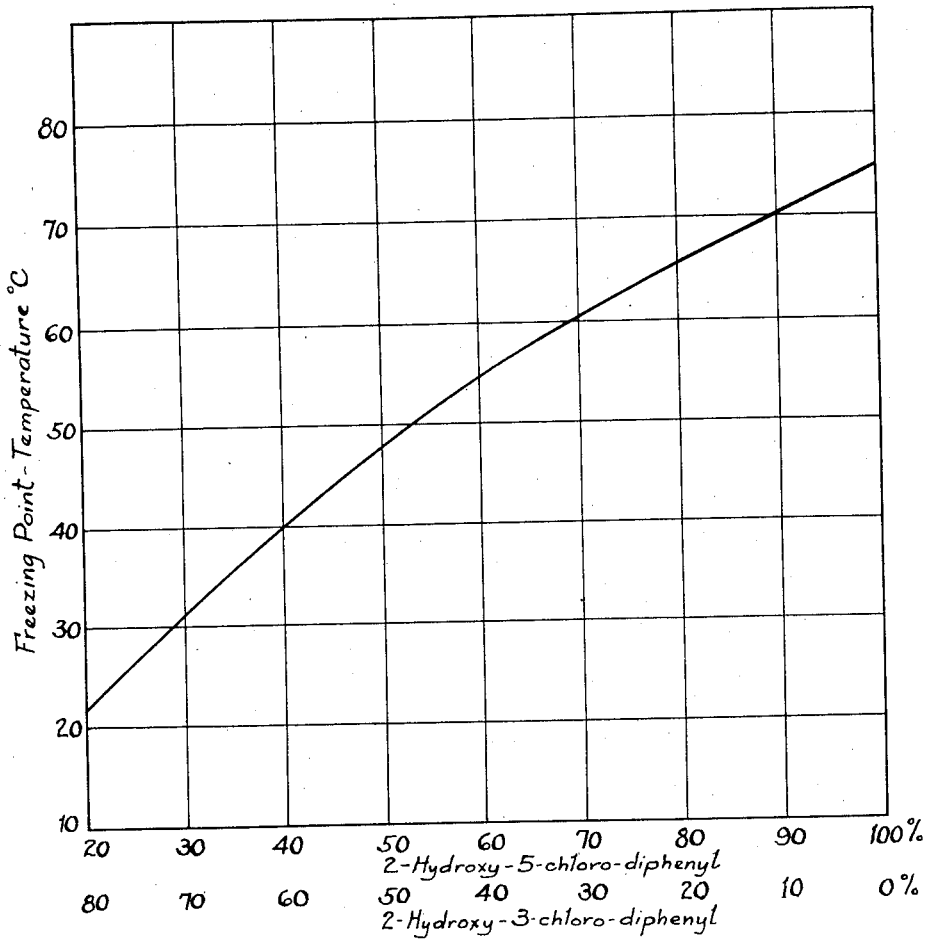
Figure 2:
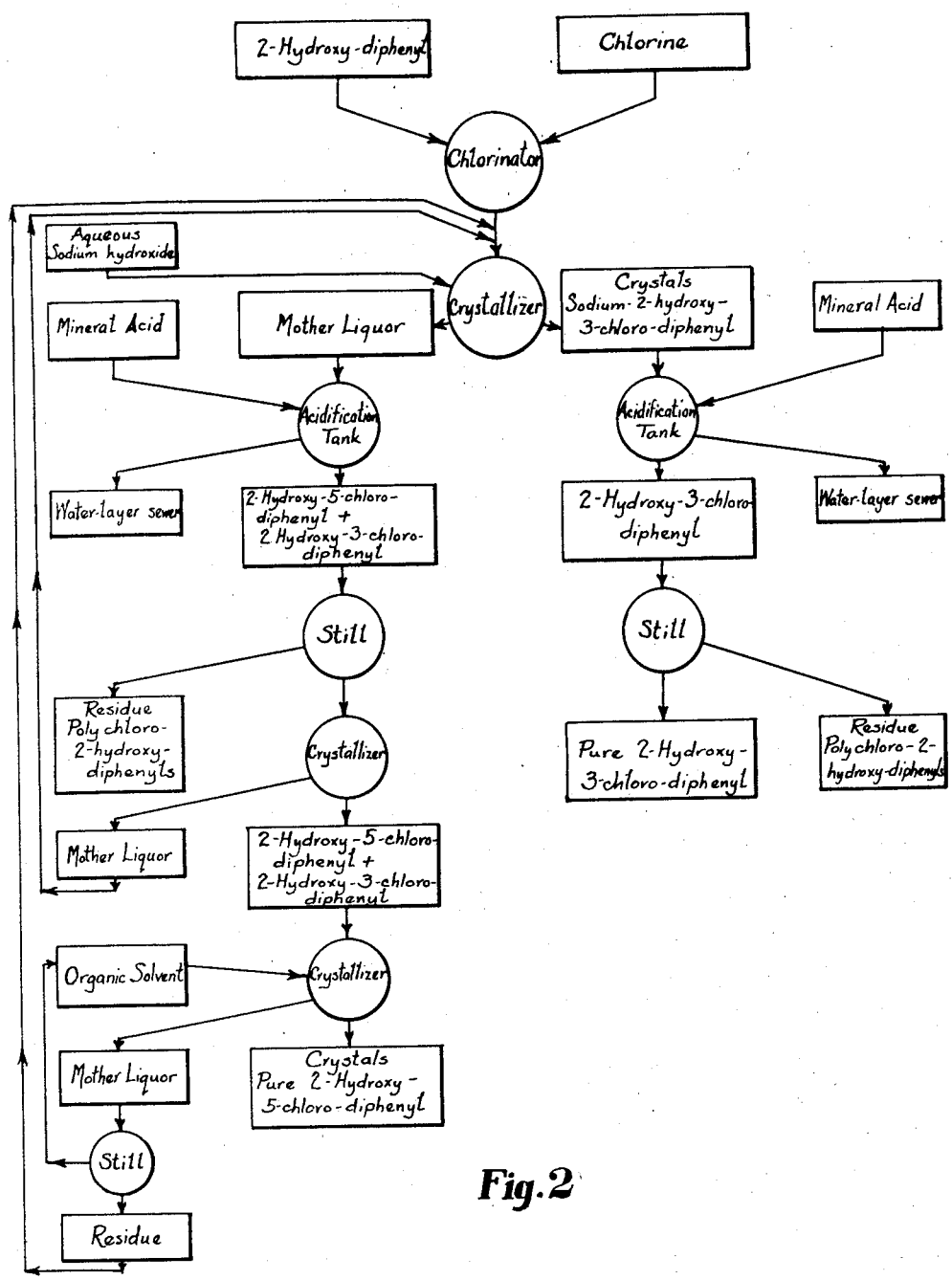

In the annexed drawings, Figure 1 is a freezing point-composition curve for the system 2-hydroxy-3-chloro-diphenyl and 2-hydroxy-5-chloro-diphenyl. By comparing the freezing point of any mixture of the above mentioned isomeric compounds with the freezing point-composition curve diagrammed as Figure 1, the composition of such mixture may be determined in the usual manner. Figure 2 is a flow sheet showing a series of plant operations which may be employed to separate the aforementioned isomeric compounds according to the present method. It will be noted that unchlorinated 2-hydroxy-diphenyl and polychloro-2-hydroxy-diphenyls are separated from the isomeric monochloro-ortho-hydroxy-diphenyls during the course of operations carried out for the separation of said isomeric compounds from each other. As alternative procedure, a batch of crude chlorinated 2-hydroxy-diphenyl may first be distilled to separate a mixture of isomeric monochloro-2-hydroxy-diphenyl from unreacted 2-hydroxy-diphenyl and from polychloro-2-hydroxy-diphenyls and said mixture of monochloro-2-hydroxy-diphenyls may subsequently be separated into its components, according to procedure similar to that hereinafter described.

Although the mixture of isomeric monochloro-2-hydroxy-diphenyls may be separated readily from the other components of the aforedescribed reaction mixture through fractionally distilling the latter, 2-hydroxy-3-chloro-diphenyl and 2-hydroxy-5-chloro-diphenyl cannot conveniently be separated from each other by such means, since the compounds boil within a few degrees of the same temperature and tend to distill together, even when an efficient fractionating column is employed in the operation.

Simple fractional crystallization of the free compounds from organic solvents does not afford a practicable means for separating the above mentioned isomers, except when a mixture of 2-hydroxy-3-chloro-diphenyl and 2-hydroxy-5-chloro-diphenyl contains more than about 20 per cent of the latter compound. In the latter case a portion of the last mentioned compound may be separated in substantially pure state through fractional crystallization of the mixture, either in the presence or absence of an organic solvent.

We have also found that 2-hydroxy-3-chloro-diphenyl and 2-hydroxy-5-chloro-diphenyl may be separated by means of an improved fractional crystallization method in which the mixture is dissolved in a suitable alkali and the corresponding salt of 2-hydroxy-3-chloro-diphenyl, i. e. the sodium, potassium, or barium salt, is crystallized from the solution, employing water, alcohol, or acetone as solvent. By acidifying the crystalline salt, 2-hydroxy-3-chloro-diphenyl may be obtained nearly pure, and may be purified still further by redistillation. The mother liquor from the crystallization, which will contain in excess of 20 per cent of the 5-chloro compound, is acidified with a mineral acid, and the mixture of 2-hydroxy-3-chloro-diphenyl and 2-hydroxy-5-chloro-diphenyl, which separates after such acidification, is fractionally crystallized to separate substantially pure 2-hydroxy-5-chloro-diphenyl therefrom.

The last mentioned crystallization may be carried out in the absence of a solvent or from any of a wide variety of organic solvents, e. g. carbon tetrachloride, chloroform, petroleum ether, ether, alcohol, benzene, etc., or a mixture of organic solvents. In practice we prefer first to crystallize 2-hydroxy-5-chloro-diphenyl from a mixture of the isomeric monochloro-2-hydroxy-diphenyls directly, in the absence of a solvent, and then to purify further said compound by recrystallizing it from an organic medium. The mother liquors remaining after the separation of purified 2-hydroxy-5-chloro-diphenyl are combined, organic solvent removed therefrom, and the residue, which consists of a mixture of the isomeric monochloro-2-hydroxy-diphenyls, is added to a fresh batch of chlorinated ortho-hydroxy-diphenyl, which may then be treated in accordance with the steps described above.

One mode of practicing the present invention is to dissolve crude chlorinated 2-hydroxy-diphenyl in approximately 20 per cent more than its chemical equivalent of an aqueous, about 25 per cent sodium hydroxide solution, the mixture being maintained at about 60° C., or higher, until solution is complete. The solution is then cooled to about room temperature, whereupon 2-hyroxy-3-chloro-diphenyl crystallizes in the form of its sodium salt. The salt is separated from its liquor, dissolved in water, the aqueous solution acidified with a mineral acid, such as sulphuric or hydrochloric acid, and free 2-hydroxy-3-chloro-diphenyl is separated from the resulting mixture. The product, so obtained, consists of 2-hydroxy-3-chloro-diphenyl intermixed with a relatively small quantity of polychloro-2-hydroxy-diphenyls. Said product is then distilled under a pressure of about, or below, 15 millimeters of mercury, it being essential that such operation be carried out under a pressure not materially greater than that mentioned as monochloro-2-hydroxy-diphenyls tend to decompose when distilled under higher pressures. Through such distillation, 2-hydroxy-3-chloro-diphenyl is obtained in substantially pure form.

The alkaline mother liquor, from which the sodium salt of 2-hydroxy-3-chloro-diphenyl was separated, is acidified with a mineral acid, the oil layer, which forms after such acidification and which consists of a mixture of isomeric monochloro-2-hydroxy-diphenyls containing more than 20 per cent of the 5-chloro isomer, is distilled under a pressure preferably not exceeding 15 millimeters of mercury. The distillate is cooled to about room temperature or lower, whereupon a fraction, containing generally from 70 to 80 per cent of 2-hydroxy-5-chloro-diphenyl, crystallizes. The crystalline material is separated and its mother liquor is combined with a fresh batch of monochloro-2-hydroxy-diphenyls and is returned to the process. The crystals are recrystallized from an organic solvent to separate substantially pure 2-hydroxy-5-chloro-diphenyl therefrom. All solvent is removed from the mother liquor; remaining after the last mentioned crystallization, and the residue is combined with a fresh mixture of monochloro-2-hydroxy-diphenyls and is returned to the process.

As procedure alternative to that described above, crude chlorinated 2-hydroxy-diphenyl may first be distilled to separate the mixture of isomeric monochloro-2-hydroxy-diphenyls both from unreacted 2-hydroxy-diphenyl and from polychloro-2-hydroxy-diphenyls. The mixture of isomeric monochloro-2-hydroxy-diphenyls may then be separated into its components through procedure similar to that described above.

It will be understood that the order of steps, specific temperatures, and concentrations mentioned above are illustrative of but one of the various set of operating conditions which may be employed in practicing our invention and are not to be construed as a limitation thereon. The steps, hereinbefore described, may be changed in order and any of a wide variety of operating conditions, with regard to concentrations of reagents and operating temperatures, may be employed successfully. Again, 2-hydroxy-3-chloro-diphenyl may be separated through fractional crystallization of either the potassium or barium salts of the aforementioned isomeric monochloro-ortho-hydroxy-diphenyls, the mode of operation, in each instance, being similar to that described above.

Other modes of applying the principle of our invention may be employed instead of those explained, change being made as regards the method herein disclosed, provided the step or steps stated by any of the following claims or the equivalent of such stated step or steps be employed.

We therefore particularly point out and distinctly claim as our invention:—

1. In a method of separating 2-hydroxy-3-chloro-diphenyl and 2-hydroxy-5-chloro-diphenyl from a mixture containing said compounds, the last named isomer being present in amount representing not more than 20 per cent of the total weight of the mono-chloro-2-hydroxy-diphenyls, the steps which consist in converting each of said compounds to a salt of the same with a metal selected from the group consisting of sodium, potassium, and barium, fractionally crystallizing the metal salt of 2-hydroxy-3-chloro-diphenyl from a solution of the above mentioned isomeric salts in a medium selected from the group consisting of water, alcohol, acetone, and mixtures thereof, acidifying the crystalline salt of 2-hydroxy-3-chloro-diphenyl with a mineral acid to liberate purified 2-hydroxy-3-chloro-diphenyl therefrom, acidifying the mother liquor remaining after the above mentioned crystallization to liberate a mixture of the above mentioned isomeric monochloro-ortho-hydroxy-diphenyls as free compounds, separating the mixture of said compounds from the liquor in which they are formed, fractionally crystallizing a portion of the 2-hydroxy-5-chloro-diphenyl from a solution containing the last mentioned mixture of isomeric compounds, separating all solvent material from the mother liquor remaining after the last mentioned crystallization, and returning the residual mixture of isomeric monochloro-2-hydroxy-diphenyls through the steps therein described.

2. In a method of separating 2-hydroxy-3-chloro-diphenyl and 2-hydroxy-5-chloro-diphenyl from a mixture containing said compounds, the last named isomer being present in amount representing not more than 20 per cent of the total weight of the mono-chloro-2-hydroxy-diphenyls, the steps which consist in converting each of said compounds to its sodium salt, fractionally crystallizing the sodium salt of 2-hydroxy-3-chloro-diphenyl from an aqueous solution containing the sodium salts of each of the above mentioned monochloro-otho-hydroxy-diphenyls, acidifying the sodium salt of 2-hydroxy-3-chloro-diphenyl with a strong mineral acid to liberate purified 2-hydroxy-3-chloro-diphenyl therefrom, acidifying the aqueous mother liquor from the above mentioned crystallization with a strong mineral acid to liberate a mixture of the aforementioned monochloro-2-hydroxy-diphenyls as free compounds, separating the mixture of said compounds from the liquor in which they are formed, fractionally crystallizing a portion of the 2-hydroxy-5-chloro-diphenyl from a solution containing the last mentioned mixture of monochloro-2-hydroxy-diphenyls, separating all solvent material from the mother liquor remaining after the last mentioned crystallization, and returning the residual mixture of isomeric monochloro-ortho-hydroxy-diphenyls through the steps herein described.

3. In a method of separating 2-hydroxy-3-chloro-diphenyl and 2-hydroxy-5-chloro-diphenyl from a mixture containing said compounds and 2-hydroxy-diphenyl and polychloro-2-hydroxy-diphenyls, the last named isomer being present in amount representing not more than 20 per cent of the total weight of the monochloro-2-hydroxy-diphenyls, the steps which consist in distilling such mixture under sub-atmospheric pressure to separate a mixture of the above mentioned isomeric monochloro-2-hydroxy-diphenyls from the other phenolic compounds mentioned, dissolving said mixture of isomeric monochloro-2-hydroxy-diphenyls in at least their combined chemical equivalent of aqueous sodium hydroxide, crystallizing a portion of the sodium salt of 2-hydroxy-3-chloro-diphenyl from the resultant solution, separating said crystalline salt from the aqueous mother liquor, dissolving the sodium salt of 2-hydroxy-3-chloro-diphenyl in water, acidifying the resultant solution with a mineral acid to liberate 2-hydroxy-3-chloro-diphenyl as a free compound, separating the latter compound from the aqueous solution in which it is formed, distilling the 2-hydroxy-3-chloro-diphenyl under a pressure not exceeding 15 millimeters of mercury to obtain said compound in a purified form, acidifying the aqueous mother liquor (from which the sodium salt of 2-hydroxy-3-chloro-diphenyl was crystallized) to liberate a mixture of the previously mentioned monochloro-2-hydroxy-diphenyls as free compounds, separating the last mentioned mixture of free compounds from the liquor in which they were formed, fractionally crystallizing a portion of the 2-hydroxy-5-chloro-diphenyl from a solution containing the last mentioned mixture of isomeric compounds, distilling solvent material from the mother liquor remaining after the last mentioned crystallization, and returning the residual mixture of isomeric monochloro-2-hydroxy-diphenyls through the steps herein described.

4. In a method of separating 2-hydroxy-3-chloro-diphenyl and 2-hydroxy-5-chloro-diphenyl from a mixture containing said compounds, the last named isomer being present in amount representing not more than 20 per cent of the total weight of the monochloro-2-hydroxy-diphenyls, the steps which consist in dissolving such mixture of hydroxy compounds in about 20 per cent more than its chemical equivalent of an aqueous, approximately 25 per cent sodium hydroxide solution, the mixture being maintained at a temperature sufficiently high to permit complete solution during such operation, then cooling the solution to a temperature such that the sodium salt of 2-hydroxy-3-chloro-diphenyl crystallizes therefrom, and separating said crystalline sodium salt from the aqueous mixture.

5. In a method of separating 2-hydroxy-3-chloro-diphenyl and 2-hydroxy-5-chloro-diphenyl from a mixture of said compounds, the last named isomer being present in amount representing not more than 20 per cent of the total weight of the monochloro-2-hydroxy-diphenyls, the steps which consist in dissolving such mixture in more than its chemical equivalent of an aqueous solution of a hydroxide selected from the group consisting of sodium, potassium and barium hydroxides, crystallizing and separating the corresponding metal salt of 2-hydroxy-3-chloro-diphenyl from the solution so formed, treating said metal salt of 2-hydroxy-3-chloro-diphenyl with a strong mineral acid to liberate 2-hydroxy-3-chloro-diphenyl as a free compound, separating the latter compound from the liquor in which it was formed, and distilling said compound under a pressure not exceeding 15 millimeters of mercury to obtain 2-hydroxy-3-chloro-diphenyl in a purified form.

6. In a method of separating 2-hydroxy-3-chloro-diphenyl and 2-hydroxy-5-chloro-diphenyl from a mixture of said compounds, the last named isomer being present in amount representing not more than 20 per cent of the total weight of the monochloro-2-hydroxy-diphenyls, the steps which consist in dissolving such mixture in about 20 per cent more than its chemical equivalent of an aqueous, approximately 25 per cent sodium hydroxide solution, the mixture being maintained at about or above 65° C., during such operation, then cooling the solution to about room temperature whereby the sodium salt of 2-hydroxy-3-chloro-diphenyl crystallizes from the solution, and separating said crystalline sodium salt from the aqueous mixture.

7. In a method of separating 2-hydroxy-3-chloro-diphenyl and 2-hydroxy-5-chloro-diphenyl from a mixture of said compounds, the last named compound being present in amount representing more than 20 per cent of the total weight of the mixture, the steps which consist in cooling said mixture to a temperature such that 2-hydroxy-5-chloro-diphenyl crystallizes therefrom, and separating the crystalline 2-hydroxy-5-chloro-diphenyl from its mother liquor.

8. In a method of separating 2-hydroxy-3-chloro-diphenyl and 2-hydroxy-5-chloro-diphenyl from a mixture of said compounds containing the last named compound in amount representing more than 20 per cent of the combined weight of the two compounds mentioned, the steps which consist in dissolving the above described mixture in an organic solvent selected from the group consisting of carbon tetrachloride, chloroform, ether, petroleum ether, alcohol, benzene and mixtures thereof, and crystallizing a portion of the 2-hydroxy-5-chloro-diphenyl from such solution.

9. In a method of separating 2-hydroxy-3-chloro-diphenyl and 2-hydroxy-5-chloro-diphenyl from a mixture containing said compounds, the last named isomer being present in amount representing not more than 20 per cent of the total weight of the monochloro-2-hydroxy-diphenyls, the step which consists in fractionally crystallizing a salt of 2-hydroxy-3-chloro-diphenyl with a metal selected from the group consisting of sodium, potassium, and barium, from a solution containing said metal salt and the corresponding metal salt of 2-hydroxy-5-chloro-diphenyl dissolved in a medium selected from the group consisting of water, alcohol, acetone and mixtures thereof.

10. In a method of separating 2-hydroxy-3-chloro-diphenyl and 2-hydroxy-5-chloro-diphenyl from a mixture containing said compounds, the last named isomer being present in amount representing not more than 20 per cent of the total weight of the monochloro-2-hydroxy-diphenyls, the step which consists in fractionally crystallizing a salt of 2-hydroxy-3-chloro-diphenyl with a metal selected from the group consisting of sodium, potassium, and barium, from an aqueous solution containing said metal salt and the corresponding metal salt of 2-hydroxy-5-chloro-diphenyl.

11. In a method of separating 2-hydroxy-3-chloro-diphenyl and 2-hydroxy-5-chloro-diphenyl from a mixture containing said compounds, the last named isomer being present in amount representing not more than 20 per cent of the total weight of the mono-chloro-2-hydroxy-diphenyls, the step which consists in fractionally crystallizing the sodium salt of 2-hydroxy-3-chloro-diphenyl from an aqueous solution containing the sodium salts of each of the above mentioned isomeric compounds.

12. The method of purifying 2-hydroxy-3-chloro-diphenyl which comprises dissolving a mixture containing said compound and 2-hydroxy-5-chloro-diphenyl, the latter being present in amount representing not more than 20 per cent of the total weight of the monochloro-2-hydroxy-diphenyls, in an excess of aqueous sodium hydroxide, crystallizing and separating the sodium salt of 2-hydroxy-3-chloro-diphenyl from the alkaline solution, treating said crystalline sodium salt with a strong mineral acid to liberate free 2-hydroxy-3-chloro-diphenyl therefrom, separating the latter compound from the liquor in which it is formed, and distilling said latter compound under a pressure not exceeding 15 millimeters of mercury to obtain purified 2-hydroxy-3-chloro-diphenyl as a distillate.

13. In a method of separating 2-hydroxy-3-chloro-diphenyl and 2-hydroxy-5-chloro-diphenyl from a mixture containing the same, the last named compound being present in amount representing not more than 20 per cent of the total weight of the monochloro-2-hydroxy-diphenyls, the steps which consist in dissolving the mixture in an alkali, crystallizing out a salt of 2-hydroxy-3-chloro-diphenyl and separating the same from the mother liquor, acidifying the mother liquor, separating the phenols from the acidified mixture, fractionally distilling the phenolic mixture to separate a mixture consisting substantially of 2-hydroxy-3-chloro-diphenyl and 2-hydroxy-5-chloro-diphenyl in which the latter compound is present in amount representing at least 20 per cent of the total weight of the mixture and fractionally crystallizing said last mentioned mixture to separate 2-hydroxy-5-chloro-diphenyl therefrom.

14. In a method of separating 2-hydroxy-3-chloro-diphenyl and 2-hydroxy-5-chloro-diphenyl from a mixture containing the same, the step which consists in fractionally crystallizing such mixture, containing the 5-chloro-isomer in amount representing at least 20 per cent of the total weight of the monochloro-2-hydroxy-diphenyls, to separate 2-hydroxy-5-chloro-diphenyl therefrom.

EDGAR C. BRITTON.
FRED BRYNER.